US011676347B2

(12) United States Patent
Goldberg et al.

(10) Patent No.: US 11,676,347 B2
(45) Date of Patent: Jun. 13, 2023

(54) VIRTUAL TRY-ON SYSTEMS FOR SPECTACLES USING REFERENCE FRAMES

(71) Applicant: Warby Parker Inc., New York, NY (US)

(72) Inventors: David Goldberg, New York, NY (US); Andrew Garrison, New York, NY (US); Adam Greenberg, New York, NY (US); Paul Johnson, New York, NY (US); Paul Mackey, New York, NY (US)

(73) Assignee: Warby Parker Inc., New York, NY (US)

( * ) Notice: Subject to any disclaimer, the term of this patent is extended or adjusted under 35 U.S.C. 154(b) by 0 days.

(21) Appl. No.: 17/226,454

(22) Filed: Apr. 9, 2021

(65) Prior Publication Data
US 2021/0327148 A1 Oct. 21, 2021

Related U.S. Application Data

(60) Provisional application No. 63/010,421, filed on Apr. 15, 2020.

(51) Int. Cl.
*G06T 19/00* (2011.01)
*G06F 3/0482* (2013.01)
(Continued)

(52) U.S. Cl.
CPC .......... *G06T 19/006* (2013.01); *G06F 3/0482* (2013.01); *G06Q 30/0643* (2013.01);
(Continued)

(58) Field of Classification Search
CPC ......... G06T 19/006; G06T 7/11; G06T 7/194; G06T 7/60; G06T 7/70; G06T 2200/24;
(Continued)

(56) References Cited

U.S. PATENT DOCUMENTS 2,818,775 A   1/1956 Ullrich
4,007,990 A   2/1977 McDevitt, Jr. et al.
(Continued)

FOREIGN PATENT DOCUMENTS

DE        19632829 A    3/1997
DE    102007057260 A    6/2009
(Continued)

OTHER PUBLICATIONS

Mar. 23, 2021 Examination Report No. 1 for Standard Patent issued by the Australian Patent Office for Australian Patent Application No. 2019419376.
(Continued)

*Primary Examiner* — Jeffery A Brier
(74) *Attorney, Agent, or Firm* — Duane Morris LLP

(57) ABSTRACT

A method for virtual try-on of user-wearable items is provided. The method includes capturing, in a client device, a first image of a user, the first image including a reference token for a user-wearable item and displaying, in the client device, images of multiple user-wearable items for the user, receiving an input from the user, the input indicative of a selected user-wearable item from the user-wearable items on display. The method also includes segmenting the first image to separate the reference token from a background comprising a portion of a physiognomy of the user, replacing a segment of the reference token in the first image with an image of the selected user-wearable item in a second image of the user, and displaying, in the client device, the second image of the user.

20 Claims, 9 Drawing Sheets

600 ⟶

US 11,676,347 B2

Page 2

(51) Int. Cl.
*G06T 7/194* (2017.01)
*G06T 7/11* (2017.01)
*G06T 7/70* (2017.01)
*G06Q 30/0601* (2023.01)
*G06T 7/60* (2017.01)
*G06V 40/16* (2022.01)

(52) U.S. Cl.
CPC .............. *G06T 7/11* (2017.01); *G06T 7/194* (2017.01); *G06T 7/60* (2013.01); *G06T 7/70* (2017.01); *G06V 40/171* (2022.01); *G06T 2200/24* (2013.01); *G06T 2207/30201* (2013.01)

(58) Field of Classification Search
CPC ............ G06T 2207/30201; G06T 7/73; G06F 3/0482; G06Q 30/0643; G06V 40/171; G06V 20/20; G06V 40/10
See application file for complete search history.

(56) References Cited

U.S. PATENT DOCUMENTS

| | | |
|---|---|---|
| 4,070,115 A | 1/1978 | Humphrey |
| 4,090,790 A | 5/1978 | Dragon et al. |
| 4,779,979 A | 10/1988 | Iwane |
| 5,247,341 A | 9/1993 | Kurachi et al. |
| 5,307,141 A | 4/1994 | Fujieda |
| 5,379,111 A | 1/1995 | Kajino et al. |
| 5,414,505 A | 5/1995 | Ikezawa et al. |
| 5,489,978 A | 2/1996 | Okumura et al. |
| 5,521,700 A | 5/1996 | Kajino et al. |
| 5,621,564 A | 4/1997 | Kageyama et al. |
| 5,657,710 A | 8/1997 | Foster et al. |
| 5,682,234 A | 10/1997 | Kajino |
| 5,684,576 A | 11/1997 | Kajino et al. |
| 5,855,074 A | 6/1999 | Abitbol et al. |
| 6,056,633 A | 5/2000 | Seseña et al. |
| 6,496,253 B1 | 12/2002 | Vokhmin |
| 6,621,564 B2 | 9/2003 | Akiyama et al. |
| 6,657,710 B2 | 12/2003 | Kajino et al. |
| 6,972,837 B2 | 12/2005 | Kajino |
| 7,016,824 B2 | 3/2006 | Waupotitsch et al. |
| 7,209,224 B2 | 4/2007 | Kajino |
| 7,245,362 B2 | 7/2007 | Kobayashi et al. |
| 7,609,371 B2 | 10/2009 | Kajino |
| 7,733,468 B2 | 6/2010 | Kajino |
| 7,742,158 B2 | 6/2010 | Divo et al. |
| 8,564,645 B2 | 10/2013 | Suzuki |
| 8,789,945 B2 | 7/2014 | Suzaki et al. |
| 9,019,458 B2 | 4/2015 | Kim et al. |
| 9,228,920 B2 | 1/2016 | Blonde et al. |
| 9,357,204 B2 | 5/2016 | Dehais et al. |
| 9,549,669 B2 | 1/2017 | Limon |
| 9,778,136 B2 | 10/2017 | Suzuki et al. |
| 9,892,561 B2 | 2/2018 | Choukroun et al. |
| 9,990,780 B2 | 6/2018 | Kornilov et al. |
| 10,036,685 B2 | 7/2018 | Goldberg et al. |
| 10,321,820 B1 | 6/2019 | Gollier et al. |
| 10,330,566 B2 | 6/2019 | Hofmann et al. |
| 10,825,260 B2 | 11/2020 | Goldberg et al. |
| 2005/0190264 A1* | 9/2005 | Neal .................... G02C 13/003 348/207.1 |
| 2010/0283844 A1* | 11/2010 | Sayag .................. G02C 13/003 348/78 |
| 2011/0071804 A1 | 3/2011 | Xie |
| 2012/0105799 A1 | 5/2012 | Stewart |
| 2013/0088490 A1 | 4/2013 | Rasmussen et al. |
| 2013/0321412 A1 | 12/2013 | Coon et al. |
| 2013/0335416 A1 | 12/2013 | Coon et al. |
| 2015/0055085 A1 | 2/2015 | Fonte et al. |
| 2015/0178936 A1 | 6/2015 | Boisson et al. |
| 2015/0293382 A1* | 10/2015 | Jethmalani ........... G02C 13/003 351/204 |
| 2015/0324951 A1 | 11/2015 | Coon et al. |
| 2016/0180419 A1* | 6/2016 | Adeyoola ................ G06T 7/11 705/26.25 |
| 2016/0223429 A1 | 8/2016 | Fecnher et al. |
| 2016/0246078 A1 | 8/2016 | Choukroun et al. |
| 2016/0269645 A1 | 9/2016 | Khoe et al. |
| 2017/0076523 A1 | 3/2017 | Rumble et al. |
| 2017/0079523 A1 | 3/2017 | Limon |
| 2017/0322110 A1 | 11/2017 | Conrad et al. |
| 2018/0096537 A1 | 4/2018 | Kornilov et al. |
| 2018/0120198 A1 | 5/2018 | Glasenapp et al. |
| 2018/0164610 A1 | 6/2018 | Liang |
| 2018/0224675 A1 | 8/2018 | Gueu et al. |
| 2018/0268458 A1 | 9/2018 | Popa et al. |
| 2018/0336737 A1 | 11/2018 | Varady et al. |
| 2019/0072455 A1 | 3/2019 | Limon et al. |
| 2019/0102608 A1 | 4/2019 | Wang et al. |
| 2019/0164341 A1 | 5/2019 | Venkataraman |
| 2019/0221191 A1* | 7/2019 | Chhipa .................. G09G 3/002 |
| 2019/0225186 A1 | 7/2019 | Szawarski et al. |

FOREIGN PATENT DOCUMENTS

| | | |
|---|---|---|
| EP | 0558015 A2 | 1/1993 |
| GB | 1042954 A | 9/1966 |
| JP | 2002-108196 | 4/2002 |
| TW | 201601066 A | 1/2016 |
| TW | 201241781 A | 10/2016 |
| WO | WO 2016/076530 A1 | 5/2016 |
| WO | WO 2016/181308 A1 | 11/2016 |
| WO | WO 2016/181309 A1 | 11/2016 |
| WO | WO 2016/181310 A1 | 11/2016 |
| WO | WO 2017/125902 A1 | 7/2017 |
| WO | WO-2018191784 A1 * | 10/2018 ............ G06T 11/60 |
| WO | WO 2018/220203 A1 | 12/2018 |

OTHER PUBLICATIONS

"Collision detection in physical simulation," Wikipedia, https://en.wikipedia.org/wiki/Collision_detection (retrieved Apr. 8, 2019), 6 pages.

"Binary search algorithm," Wikipedia, https://en.wikipedia.org/wiki/Binary_search_algorithm (retrieved Apr. 8, 2019) 10 pages.

Cardinal, D., "How Apple's iPhone X TrueDepth Camera Works," Extreme Tech http//www.extremetech.com/mobile/255771-apple-iphone-x-truedepth-camera (2017) 5 pages.

"3D Facial Norms Technical Notes," FaceBase, https://www.facebase.org/facial_norms/notes (retrieved Apr. 8, 2019), 29 pages.

Jun. 30, 2021 PCT Notification of the Transmittal of the International Search Report and the Written Opinion of the International Searching Authority, or the declaration for International PCT Application No. PCT/US21/26569.

Jul. 8, 2021 Office Action issued by the Intellectual Property Office of Taiwan for Taiwanese Patent Application No. 109100106. [English translation included].

Jun. 16, 2021 International Preliminary Report on Patentability and the Written Opinion of the International Searching Authority for International PCT Application No. PCT/US2019/068200.

Nov. 23, 2020 PCT Notification of the Transmittal of the International Search Report and the Written Opinion of the International Searching Authority, or the declaration for International PCT Application No. PCT/US20/47757.

Sep. 9, 2021 Notice of Reason for Rejection issued by the Japanese Patent Office for Japanese Patent Application No. 2021-512526. [English translation included].

Sep. 16, 2021 Notice of Preliminary Rejection issued by the Korean Intellectual Property Office for Korean Patent Application No. 2021-7006780. [w/English translation ].

Jan. 22, 2020 PCT International Search Report and Written Opinion of the International Searching Authority for PCT International Application No. PCT/US2019/056827.

(56) References Cited

OTHER PUBLICATIONS

Aug. 11, 2017 PCT International Search Report and Written Opinion of the International Searching Authority for PCT International Application No. PCT/US2017/033064.

* cited by examiner

VIRTUAL TRY-ON SYSTEMS FOR SPECTACLES USING REFERENCE FRAMES

CROSS-REFERENCE TO RELATED APPLICATION(S)

This application claims priority in and to U.S. Provisional Application No. 63/010,421, filed Apr. 15, 2020, the content of which is hereby incorporated by reference herein in its entirety.

All publications, patents and/or patent applications referred to herein are incorporated by reference in their entirety to the same extent as if each individual publication, patent or patent application was specifically and individually indicated to be incorporated by reference in its entirety.

FIELD

The disclosure herein generally relates to augmented reality, and more particularly to virtual try-on systems and methods for spectacles, three-dimensional (3D) glasses, augmented reality glasses, virtual reality glasses or headset, smart glasses, sports glasses, safety glasses, or a combination thereof.

BACKGROUND

The following includes information that may be useful in understanding the invention. It is not an admission that any of the information specifically or implicitly referenced herein is prior art, or essential, to the described or claimed invention.

Augmented reality (AR) applications have been developed in which virtual objects are digitally overlaid on images of real-world objects. In some cases, virtual objects such as gaming characters are added to images of a scene displayed by a smartphone or tablet as a user navigates the scene. In other cases, cartoon features such as cartoon animal facial features are added to an image of a face of a user of a smartphone or tablet, the image having been captured by the camera of the smartphone or tablet. However, in these conventional AR systems, the cartoonish, or unrealistic, nature of the virtual objects allows significant leeway in the accuracy of the size, shape, orientation, and placement of the virtual objects relative to the real-world objects.

The use of AR systems in the fashion industry provides potential opportunities for enhanced marketing campaigns, customer engagement and sales. However, existing AR systems, such as Virtual try-on (VTO) systems, provide inaccurate and unrealistic sizing and fit of accessories (such as spectacles) and/or clothing relative to customers' true sizes and proportions. As a result, such systems lead to increased consumer frustration, decreased use or reliance of such systems and, ultimately, revenue loss.

Thus, there is a need to create an improved VTO system that addresses at least the above-stated issues, and will improve the customers' experience thereto.

SUMMARY

The invention described and claimed herein has many attributes and aspects including, but not limited to, those set forth or described or referenced in this Summary. It is not intended to be all-inclusive and the invention described and claimed herein are not limited to or by the features or embodiments identified in this Summary, which is included for purposes of illustration only and not restriction.

According to some aspects of the present disclosure, a computer-implemented method is provided. The computer-implemented method includes capturing, in a client device, a first image of a user, the first image including a reference token for a user-wearable item and displaying, in the client device, images of multiple user-wearable items for the user. The computer-implemented method also includes receiving an input from the user, the input indicative of a selected user-wearable item from the user-wearable items on display and segmenting the first image to separate the reference frame from a background comprising a portion of a physiognomy of the user. The computer-implemented method also includes replacing a segment of the reference frame in the first image with an image of the selected user-wearable item in a second image of the user and displaying, in the client device, the second image of the user.

According to some aspects of the present disclosure, a computer-implemented method is provided. The computer-implemented method includes receiving, from a client device, a first image of a user, the first image including a reference token for a user-wearable item and providing for display, to the client device, images of multiple user-wearable items for the user, stored in a database. The computer-implemented method also includes receiving an input from the user, the input indicative of a selected user-wearable item from the user-wearable items on display, providing for display, in the client device, a second image of the user, the second image having a segment of the reference token replaced with an image of the selected user-wearable item, and receiving, from the client device, a request for the selected user-wearable item.

According to some aspects of the present disclosure, a system is provided that includes a memory circuit storing instructions and a processor circuit configured to execute the instructions. When executing the instructions, the processor causes the system to capture, in a client device, a first image of a user, the first image including a reference token for a user-wearable item, and to display, in the client device, images of multiple user-wearable items for the user, to receive an input from the user, the input indicative of a selected user-wearable item from the user-wearable items on display. The processor also causes the system to segment the first image to separate the reference token from a background comprising a portion of a physiognomy of the user, to replace a segment of the reference token in the first image with an image for the selected user-wearable item in a second image of the user, and to display, in the client device, the second image of the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. The drawings are for illustration purposes only, show example non-limiting embodiments, and not necessarily drawn to scale. In the drawings.

In the figures, like elements and steps are labeled with like numeral references unless otherwise stated in the text.

DETAILED DESCRIPTION

Figure 1:
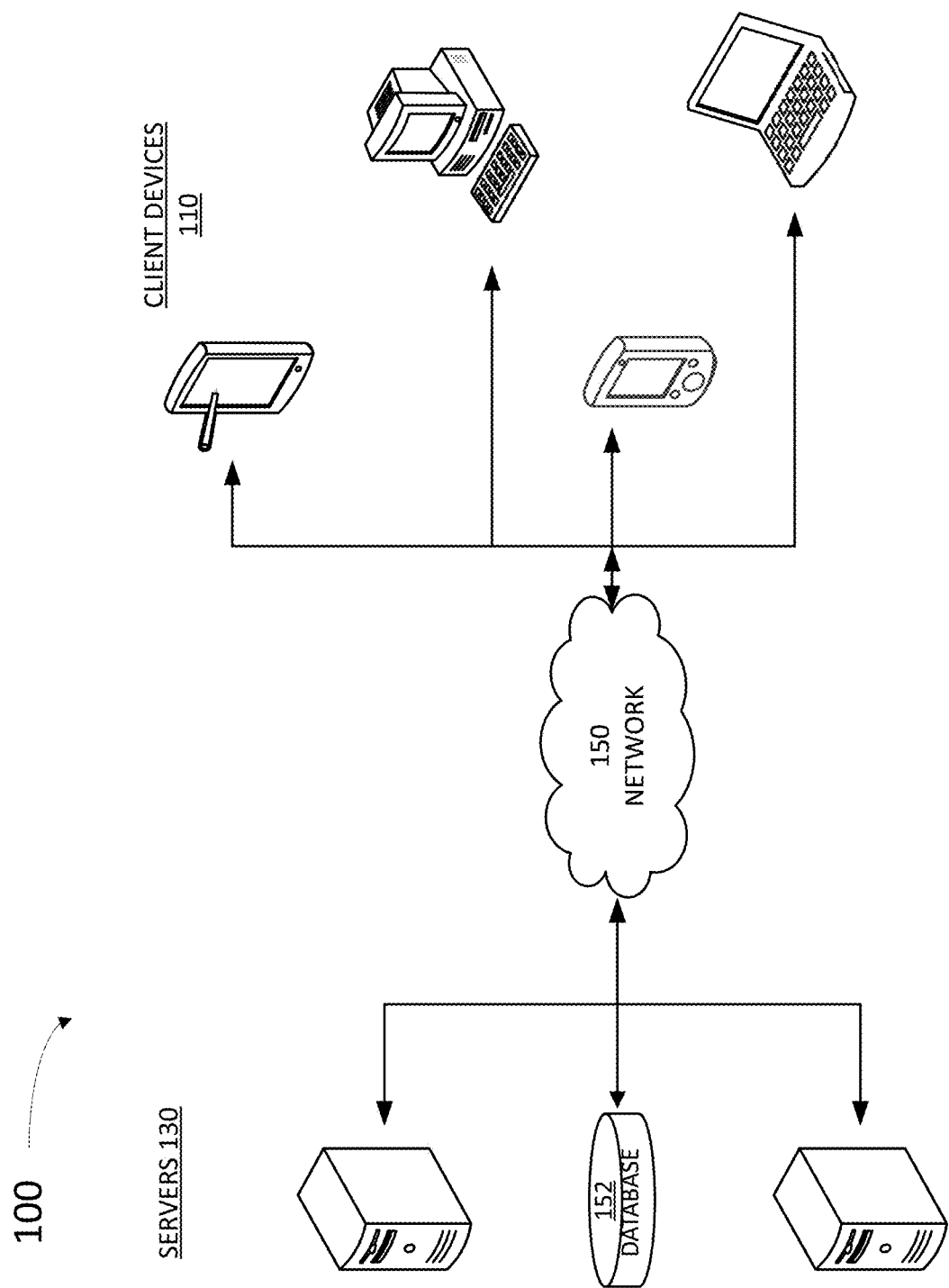
FIG. 1 illustrates an example architecture for virtual try-on systems, suitable for practicing some implementations of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

VTO systems and methods are disclosed herein. Virtual try-on systems and methods can be particularly useful for viewing how spectacles or spectacles frames would appear on the face of the user in the real world, without the user having access to the real-world spectacles or frames. In some embodiments, virtual reality (VR) displays include systems that display real images superimposed with artificially generated elements. However, it should also be appreciated that the systems and methods described herein can be applied for virtual try-on of other objects on other portions of the user's body, such as for virtual try-on of spectacles accessories, headwear, earrings, other body-piercing accessories, jewelry, clothing, or the like. Virtual try-on systems and methods as disclosed herein allow the user to visualize the way a particular real-world item would appear on the particular body of the user.

Many existing VTO solutions estimate the size of a user's face by assuming that all faces are the same size and scaling the virtual spectacle frames in proportion with the face. Thus, users with smaller- or larger-than-average heads may have the impression that a frame fits them when in reality it is too large or too small. This leads to consumer frustration when the user receives a pair of spectacles and finds out the spectacles do not look as desired, are uncomfortable, or simply do not fit the consumer. In some embodiments, a VTO system may request the user to pose with a reference object of a known size, with standardized dimensions (e.g., a credit card). For some users, this approach may seem uncomfortable or cumbersome. In some embodiments, a VTO system may use three-dimensional (3D) cameras to estimate the size of the user's face and scale the virtual glasses accordingly. However, 3D cameras may not be available for at least some users. In some scenarios, a VTO system may thus guess at how large to make a pair of virtual glasses relative to the facial features of a user in an image. This is because it is not straightforward to estimate the physical size of a user's facial features from an image, particularly when there is no scale reference in or for the image. Some VTO systems may assume that the user's head is an average size in order to determine the appropriate size of the virtual spectacles. However, an assumption of this type would generate unrealistic results for users who have heads that are smaller or larger than average.

Virtual Try-On (VTO) systems as disclosed herein use augmented reality to show a customer how a pair of spectacle frames will look on their face. Customers rely on VTO as disclosed herein to have an accurate sense of the frames' size relative to their face. In some embodiments, a VTO system as disclosed herein makes use of a reference spectacle frame provided to the customer beforehand. The customer puts on the reference frame and the VTO system superimposes a virtual frame, using the reference frame as a size reference.

Furthermore, without accurate three-dimensional information about a subject's head and facial features, a VTO system may improperly estimate the position and size of the spectacles on the subject's face. Accordingly, the use of typical features may show unrealistic results for potential customers, resulting in frustration and revenue loss.

To avoid an inaccurate rendition of a potential customer with spectacles, VTO systems as disclosed herein may request that the user inputs, to the VTO system, a first image of the user wearing a reference frame for a pair of spectacles. The reference frame for a pair of spectacles may include known dimensions. Accordingly, the first image may be used to accurately assess the dimensions and the relative distribution of a user's facial features.

In accordance with aspects of the subject disclosure, VTO systems and methods are provided that provide a realistic representation of the actual appearance of real-world spectacles on a user's face, using a captured image of a user's face wearing a reference frame for a pair of spectacles. Because the size of the user's face in the captured image is directly measured, the VTO systems and methods described herein can render a virtual representation of the spectacles in the correct relative size to the user's face. Accurate placement (e.g., positioning and/or orientation) of the virtual representation of the spectacles relative to the image of the user's face, as they would rest on the actual user's face, is described in further detail hereinafter. Moreover, some embodiments may further provide the ability for the user to try on multiple types, classes, and models of real-world spectacles, using the VTO application. For example, the user may try on tinted lenses, or gradient lenses, or frames having different colors, textures, and designs.

Embodiments as disclosed herein provide a technical solution to the technical problem of providing a remote rendition of an image of a user wearing a virtual pair of spectacles, prior to purchasing. Accordingly, embodiments as disclosed herein provide an enhanced use for a mobile computer device using the display as a virtual mirror to render an augmented reality image of the user wearing a desired pair of spectacles. Further, embodiments as disclosed herein make use of the technical advantage of broadband network computer technology to quickly render and adjust images in a time-sequence, to capture a user's natural movements and gestures while wearing the pair of spectacles. In some embodiments, a 3D model rendering tool may reside at least partially or fully within the application installed in the client device. By avoiding physically going to a store to try on a pair of spectacles, a VTO system as disclosed herein provides a significant commercial advantage for users and enhances sales capability and marketing reach out for vendors.

Through the use of a reference pair of spectacles, embodiments as disclosed herein achieve superior sizing accuracy relative to virtual try-on tools based on 2D imaging. Unlike yet other virtual try-on tools, it does not require a 3D camera, which makes the disclosed system available to a wider customer base. More generally, embodiments consistent with the present disclosure include the use of a reference frame or token for any other type of user-wearable item such as a wearable device, clothing, and the like. Accordingly, in some embodiments, a reference frame or token is provided to a potential customer. The customer takes an image of itself wearing the reference frame or token and an application in the mobile device displays for the user a virtual mirror image of the user with the wearable item. The user may strike a pose, change profiles, take pictures and videos from a different angle, and the application will return a realistic image or video of the user with the wearable item.

Although many examples provided herein describe a user's device or physical features as being identified and/or stored, each user may grant explicit permission for such user information to be collected, shared, and/or stored. The explicit permission may be granted using privacy controls integrated into the disclosed system. Each user may be provided notice that such user information will be stored with explicit consent, and each user may at any time end having the information stored, and may delete any stored user information. The stored user information may be encrypted to protect user security.

The user can at any time delete the user information from the memory circuit and/or opt out of having the user information stored in the memory circuit. Additionally, the user can, at any time, adjust appropriate privacy settings to selectively limit the types of user information stored in the memory circuit, or select the memory circuit in which the user information is stored (e.g., locally on the user's device as opposed to remotely on a server). The user information does not include and/or share the specific identification of the user (e.g., the user's name) unless otherwise specifically provided or directed by the user.

Example System Architecture

FIG. 1 illustrates an example architecture 100 for virtual try-on of spectacles, suitable for practicing some implementations of the disclosure. The architecture 100 includes servers 130 and client devices 110 connected over a network 150. As shown, third-party servers 140 may also be communicatively coupled to servers 130 and/or client devices 110 via network 150. Servers 130 may include database 142 of information associated with objects that can be virtually tried-on with one or more of client devices 110. For example, database 142 of servers 130 may include three-dimensional models of various pairs of spectacles frames, with or without lenses, that are available for purchase (e.g., from the server itself, from a physical brick-and-mortar store, or from another server such as a third-party server). In some implementations, servers 130 may also store code that, when executed by a processor circuit of the server, causes the processor circuit to provide a try-on interface (e.g., a try-on web interface) that performs the try-on methods and operations described herein. In some implementations, the code for the try-on interface may also, or alternatively, be stored at one or more of client devices 110. In these implementations, a client device running a try-on interface (e.g., generated by a try-on application running on the client device) may obtain the three-dimensional models of the spectacles from servers 130 and perform try-on operations as described herein at the client device.

Third-party servers may include servers 130 that handle sales of the spectacles for which the three-dimensional representations are stored at database 152. Servers 130 may store three-dimensional representations of other objects that can be tried on using the try-on interface provided by other servers 130 and/or client devices 110 (e.g., by storing three-dimensional models of the other objects in database 152) and providing the three dimensional models to servers 130 and/or client devices 110.

Servers 130 can each be implemented with any device having an appropriate processor circuit, memory circuit, and communications capability for hosting a try-on interface and/or for storing three-dimensional models of spectacles or other objects. Client devices 110 can be, for example, desktop computers, mobile computers, tablet computers (e.g., including e-book readers), mobile electronic devices (e.g., a smartphone, tablet, or PDA), or any other devices having appropriate imaging (e.g., visible-light imaging and/or infrared imaging), illumination (e.g., visible light illumination and/or infrared light illumination), processor circuit, memory circuit, and communications capabilities for providing a virtual try-on interface. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
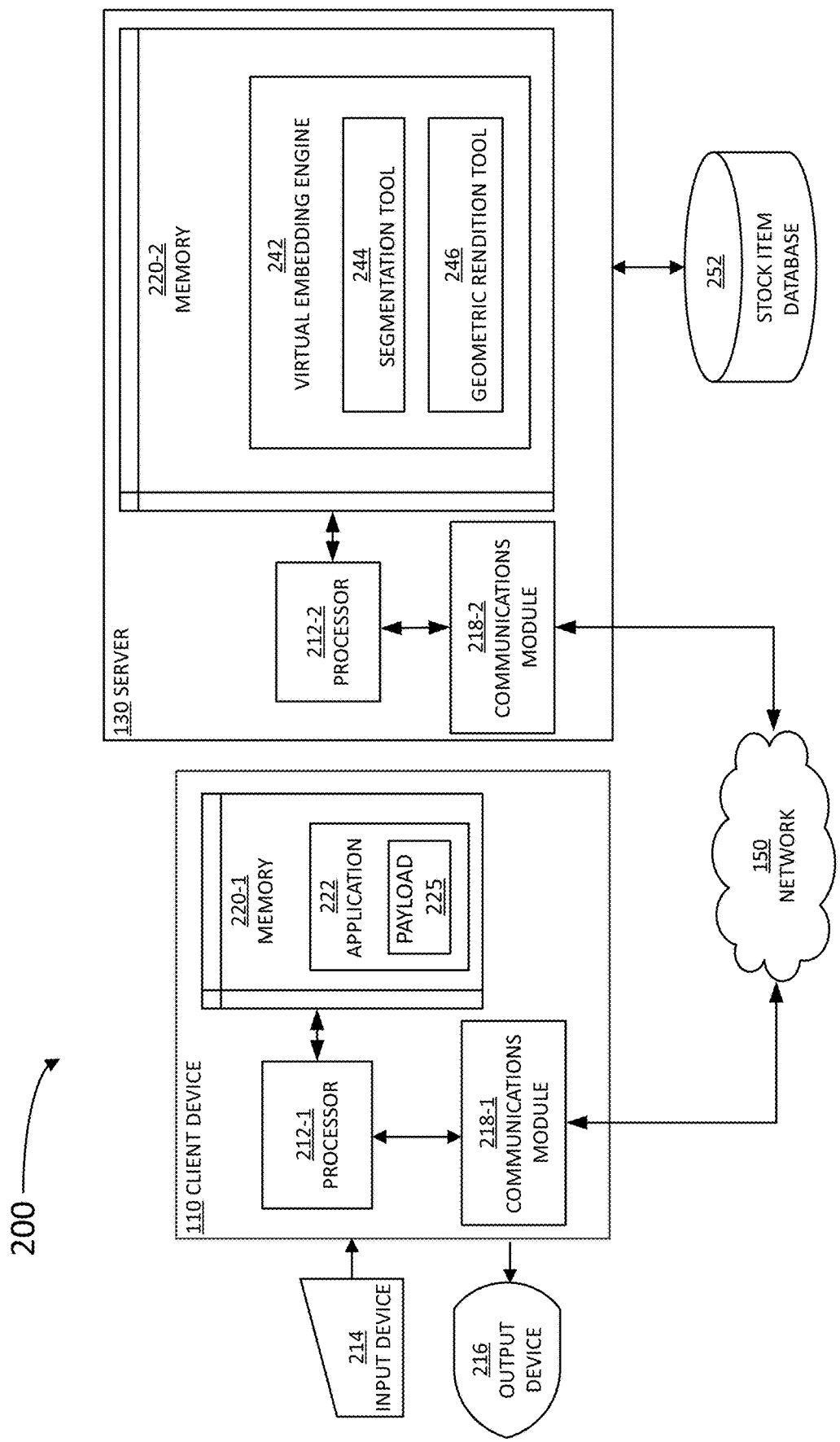
FIG. 2 is a block diagram illustrating details of some of the devices used in the architecture of FIG. 1, according to some embodiments.

FIG. 2 is a block diagram of a system 200 illustrating an example server 130 and client device 110 in architecture 100, according to some embodiments. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 may include, for example, modems or Ethernet cards. Client device 110 may be coupled with an input device 214 and with an output device 216. Input device 214 may include a keyboard, a mouse, a pointer, or even a touch-screen display that a user (e.g., a consumer) may utilize to interact with client device 110. Likewise, output device 216 may include a display and a speaker with which the user may retrieve results from client device 110. Client device 110 may also include a processor circuit 212-1, configured to execute instructions stored in a memory circuit 220-1, and to cause client device 110 to perform at least some of the steps in methods consistent with the present disclosure. Memory circuit 220-1 may further include an application 222 including specific instructions which, when executed by processor circuit 212-1, cause a payload 225 hosted by server 130 to be displayed for the consumer. Accordingly, application 222 may be installed by server 130 and perform scripts and other routines provided by server 130. In some embodiments, application 222 may be configured to display advertisement payload 225 provided by virtual embedding engine 242. Payload 225 may include multiple digital promotions, reference frames, stock items, and the like, presented to the consumer by server 130. In some embodiments, the consumer may select at least some of the reference frames or purchase stock items activating buttons and other fields in payload 225 in memory circuit 220.

Server 130 includes a memory circuit 220-2, a processor circuit 212-2, and communications module 218-2. Processor circuit 212-2 is configured to execute instructions, such as instructions physically coded into processor circuit 212-2, instructions received from software in memory circuit 220-2, or a combination of both. Memory circuit 220-2 includes a virtual embedding engine 242 for integrating images, videos, and other multimedia files stored in a stock item database 252 into an augmented reality image or video in payload 225. Virtual embedding engine 242 may form a virtual image or video combining an image or video provided by application 222 with a suitably modified image from stock item database 252. Server 130 then provides payload 225 to a user of client device 110 that is a consumer of a retail store or chain of stores, or who desires to buy a user-wearable item online.

Virtual embedding engine 242 integrates payload 225 using a segmentation tool 244 and a geometric rendition tool 246. Segmentation tool 244 may include instructions to select or create a pixel mask indicative of a reference frame from pixels in an image provided by application 222.

Geometric rendition tool 246 may include a model to determine an orientation and a position of an object of known dimensions (e.g., a reference frame stored in reference frame database 252) in a three-dimensional space. In some embodiments, the model in geometric rendition tool 246 may include instructions to simulate multiple positions and orientations of the reference frame and selecting an orientation and position of the reference frame that best matches (or closely matches, within a threshold) a pixel mask provided by segmentation tool 244.

Figure 3:
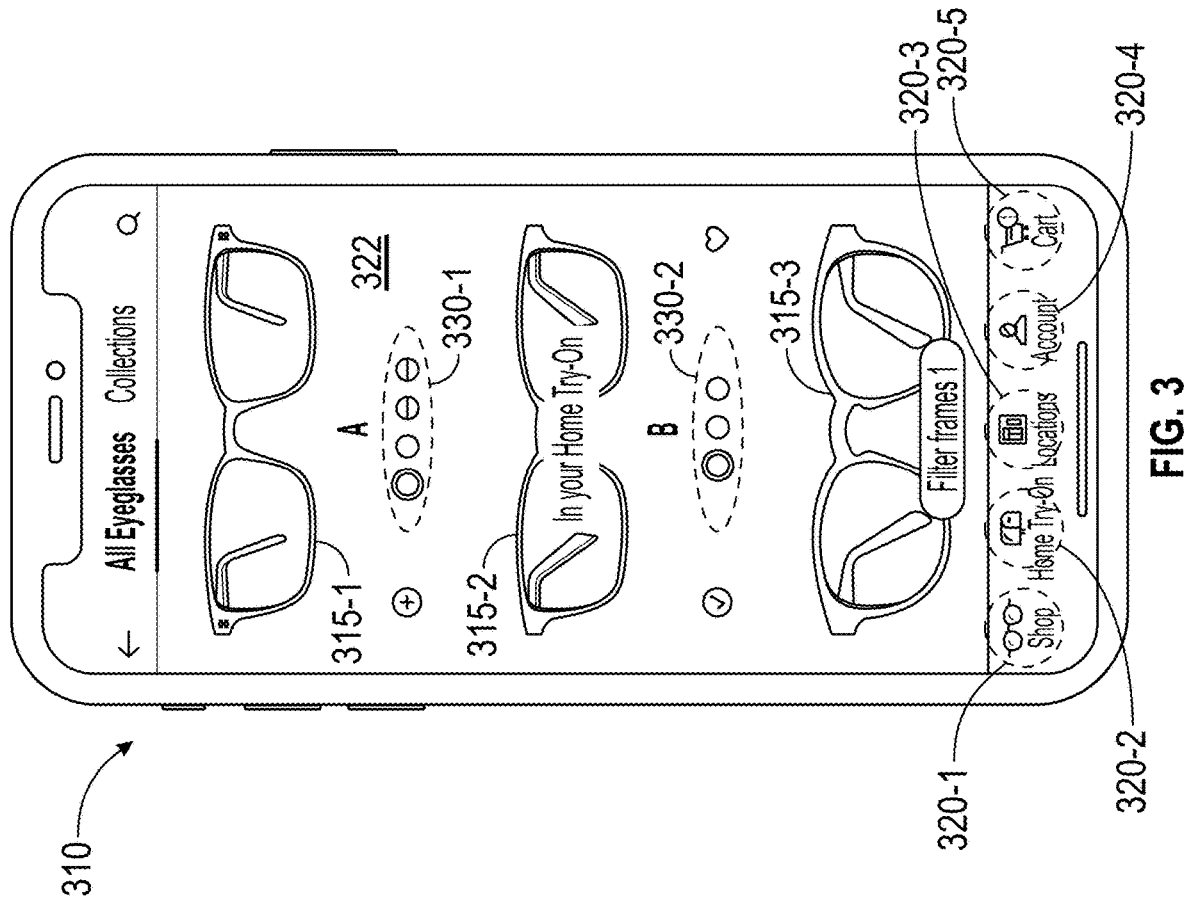
FIG. 3 is a schematic diagram illustrating multiple spectacle frames in an augmented reality try-on interface, according to some embodiments.

FIG. 3 is a schematic diagram illustrating multiple spectacle frames 315-1 ("A"), 315-2 ("B"), and 315-3 (hereinafter, collectively referred to as "spectacle frames 315") in an artificial reality try-on application 322, according to some embodiments. In some embodiments, the user of a client device 310 accesses a portal for a provider of spectacles hosted by a server (e.g., server 130) through application 322. The display of client device 310 then provides images of spectacle frames 315 for the user to choose and try on, according to some embodiments. The display may also illustrate different features 330-1 and 330-2 (hereinafter, collectively referred to as "features 330") for each of spectacle frames 315. Features 330 may include the material, color, texture, and shape of the frame of a pair of spectacles. In some embodiments, features 330 may also include the shade or type of glasses in the pair of spectacles (e.g., polarized, plated, gradient color, tinted, sunglasses, and the like).

Application 322 may include several buttons, 320-1 ("Shop"), 320-2 ("Try-On"), 320-3 ("Locations"), 320-4 ("Account"), and 320-5 ("Cart," hereinafter, collectively referred to as "buttons 320"). Shop button 320-1 may direct the user to a display as illustrated in the figure, wherein different stock items from a database (e.g., stock item database 252) are displayed for the user selection. Locations button 320-3 may direct the user to a map displaying different locations of stores where the user may find selected items for purchase. Account button 320-4 may direct the user to a personal account in the server hosting application 222 (e.g., server 130 sponsored by a store, a spectacle provider, a brand, a manufacturer, and the like). Cart button 320-5 may collect and store items selected by the user when Shop button 320-1 is activated.

Try-on button 320-2 directs the user to a VTO portal as disclosed herein. In the VTO portal, the user may try on a reference object and use client device 310 as a virtual mirror to see a realistic portrait of him/herself wearing a selected pair of spectacles, as disclosed herein.

Figure 4:
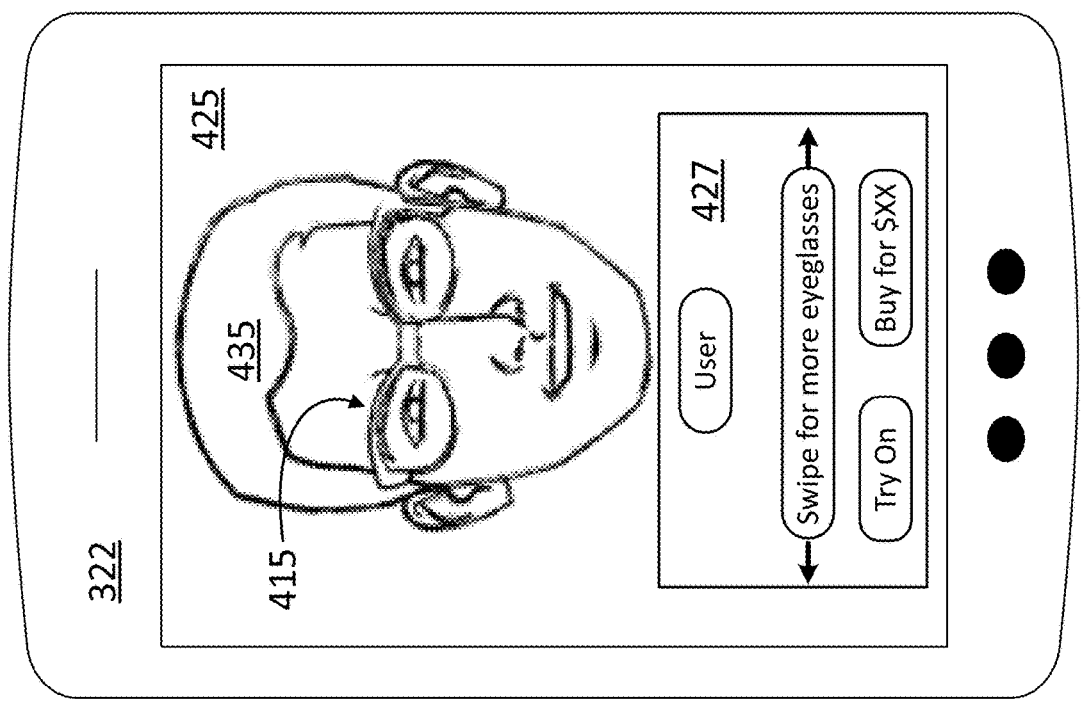
FIG. 4 is a schematic diagram illustrating an augmented reality try-on interface, according to some embodiments.

FIG. 4 is a schematic diagram illustrating a VTO portal 425 in application 322, according to some embodiments. VTO portal shows a virtual mirror image 435 of the user wearing a selected pair of spectacles 415 (e.g., selected from any one of spectacle frames 315 after pressing shop button 320-1). A field 427 may include buttons to "swipe for more eyeglasses," "try on," or "buy for (price)."

In some embodiments, the user receives (by physical delivery such as mail, and the like) a reference frame before accessing application 322. The reference frame may be a physical object having similar size and shape as spectacle frame 415. In some embodiments, the reference frame may be distinctively colored. The user then takes an image of him/herself using client device 410 while wearing the reference frame. Accordingly, VTO portal 425 can easily segment the pixels corresponding to the reference frame from the pixels corresponding to the rest of the scene. For those pixels, VTO portal 425 then displays a virtual mirror image 435 that includes the color, shape, and other features of selected spectacle frame 415 instead of those of the reference frame. Accordingly, the user can virtually try on several different colorways.

In some embodiments, the reference frame may not be distinctively colored. In yet other embodiments, the reference frame may be a conventional spectacle frame of a specific color or combination of colors. VTO portal 425 then provides a virtual mirror image 435 where the color of the pixels corresponding to the reference frame are replaced by the color of selected spectacle frame 415.

In some embodiments, the frame of selected spectacle frame 415 may be the same as the reference frame, but the spectacle lenses may be different. Accordingly, VTO portal 425 (or the server hosting the portal) segments the spectacle lenses. Thus, virtual mirror image 435 includes spectacle lenses representing the user's desired type or style. To achieve this, a VTO system as disclosed herein alters the appearance of the pixels corresponding to the spectacle lenses to represent an alternative lens (e.g., tinted, sunglasses, polarized, plated, gradient color, and the like).

In some embodiments, the reference frame may not match the size or shape of selected spectacle frame 415. Instead, the reference frame, which may be a conventional spectacle frame or a purpose-designed reference frame, may serve as a size reference. The VTO system may thus assess the size and shape of a user's head/face (e.g., by creating a 3D model of the user's head), so as to accurately mount selected spectacle frame 415 on the user's face.

Figure 5:
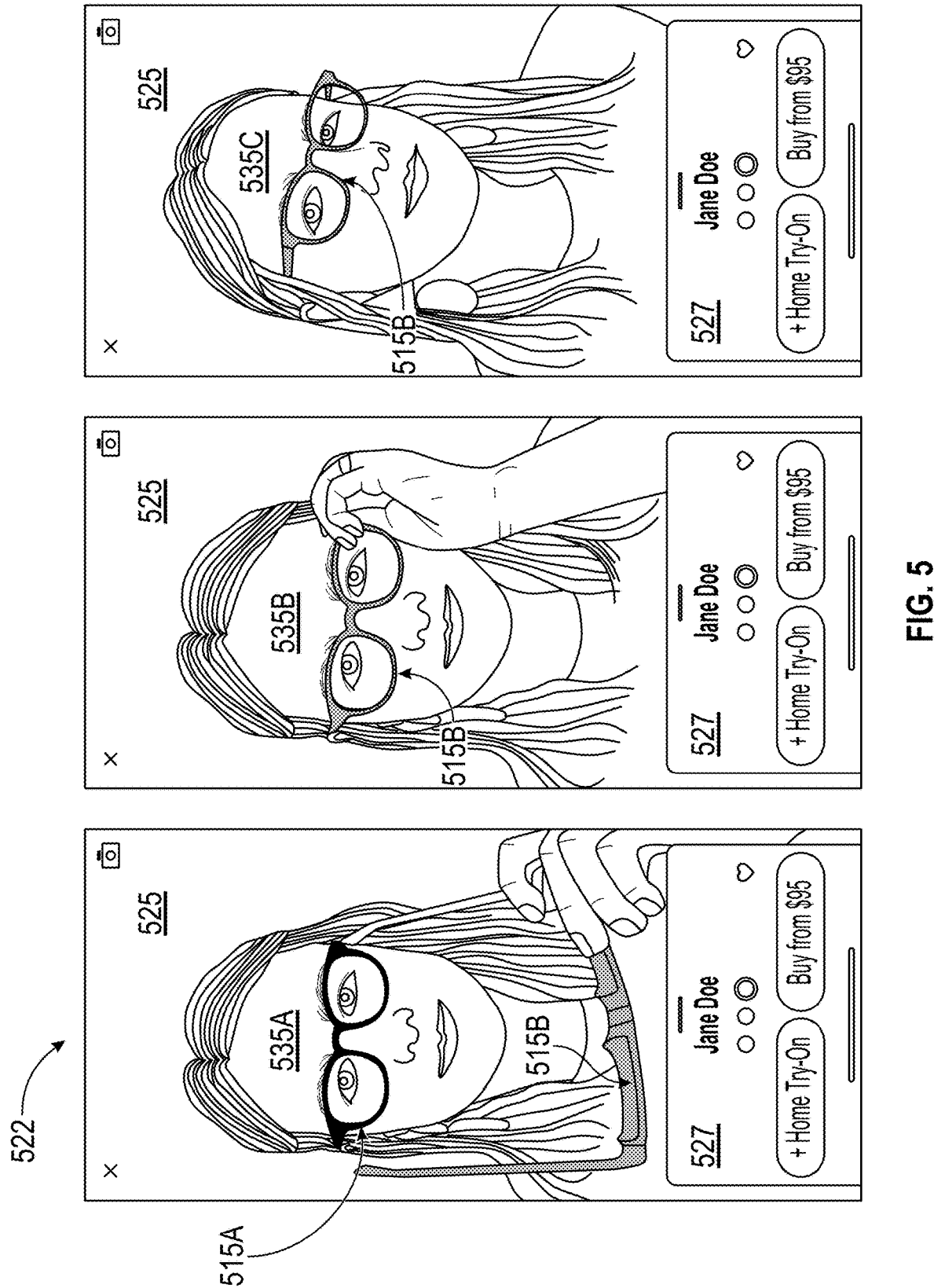
FIG. 5 illustrates multiple shots from an augmented reality try-on interface, according to some embodiments.

FIG. 5 illustrates multiple virtual mirror images 535A, 535B, and 535C (hereinafter, collectively referred to as "virtual images 535") from a VTO application 522, according to some embodiments. VTO portal 525 includes a field 527 that the user activates to switch from a selected spectacle frame 515A to a selected spectacle frame 515B. Seamlessly, as in a real mirror, VTO portal 525 provides virtual images 535 showing (e.g., in real time) a view of the user with the recently selected spectacle frame, in different poses and profiles (e.g., virtual images 535B and 535C).

Figure 6:
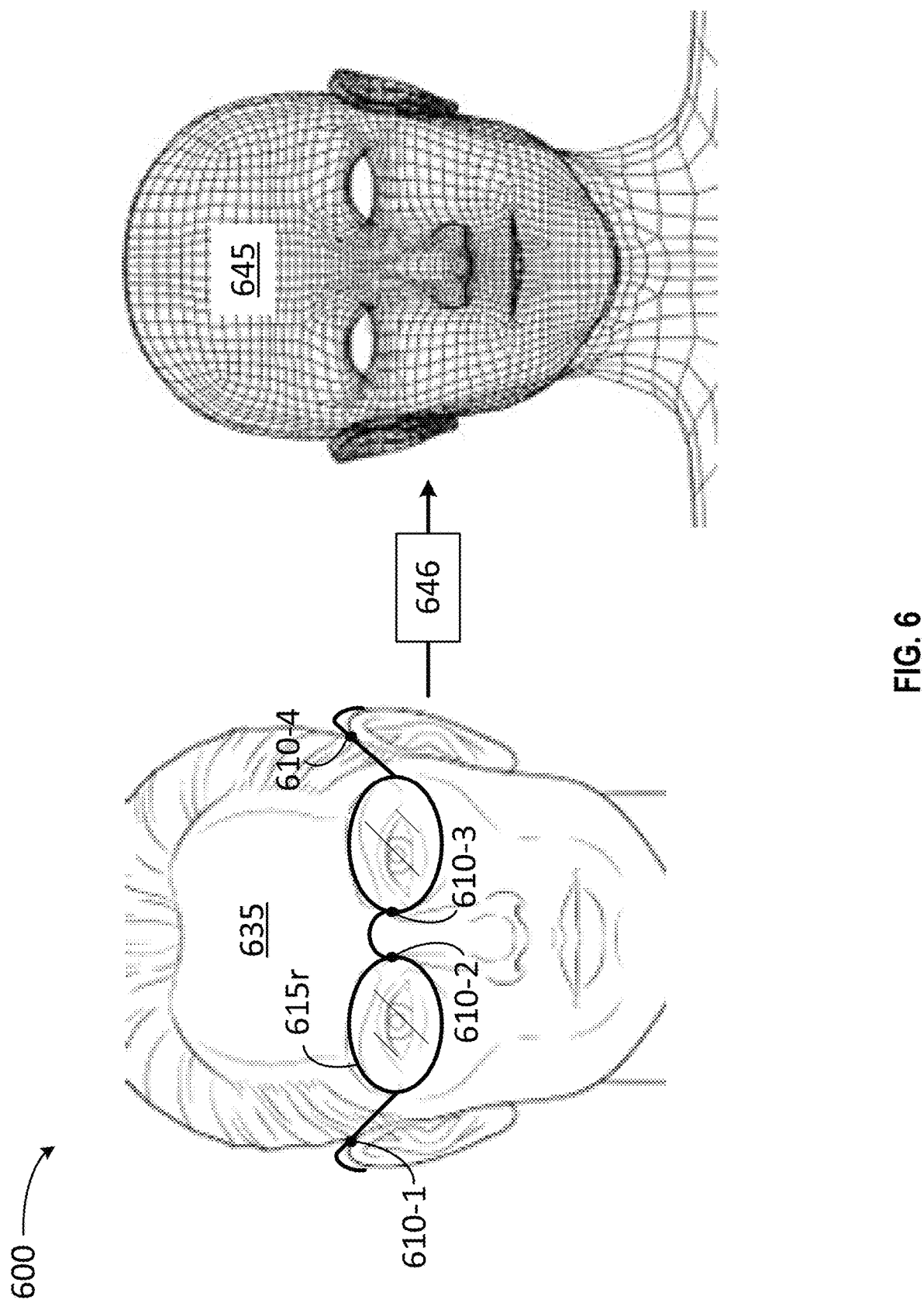
FIG. 6 is a schematic diagram illustrating a three-dimensional model of a three-dimensional image of a user, including facial landmark locations, according to some embodiments.

FIG. 6 is a schematic diagram 600 illustrating a 3D model 645 from a two-dimensional (2D) image 635 of a user, including facial landmark locations 610-1, 610-2, 610-3, and 610-4 (hereinafter, collectively referred to as "landmark locations 610"), according to some embodiments.

2D image 635 may be provided by the user wearing a reference frame 615r via a client device (e.g., client devices 110, 310, and 410), to a server. The server may process 2D image 635 with a virtual embedding engine having a segmentation tool and a geometric rendition tool 646, to generate 3D model 645. Accordingly, geometric rendition tool 646 may use landmark locations 610 where the user's head contacts reference frame 615r and a 3D model for reference frame 615r to ascertain size and shape of essential points in the user's head. Then, by selecting a 3D mesh that best fits landmark locations 610, geometric rendition tool 646 may generate 3D model 645. 3D model 645 may be used by the virtual embedding engine to provide a VTO system with a virtual image of the user, wearing a virtual pair of spectacles, shifting the head in different profiles and poses.

Figure 7:
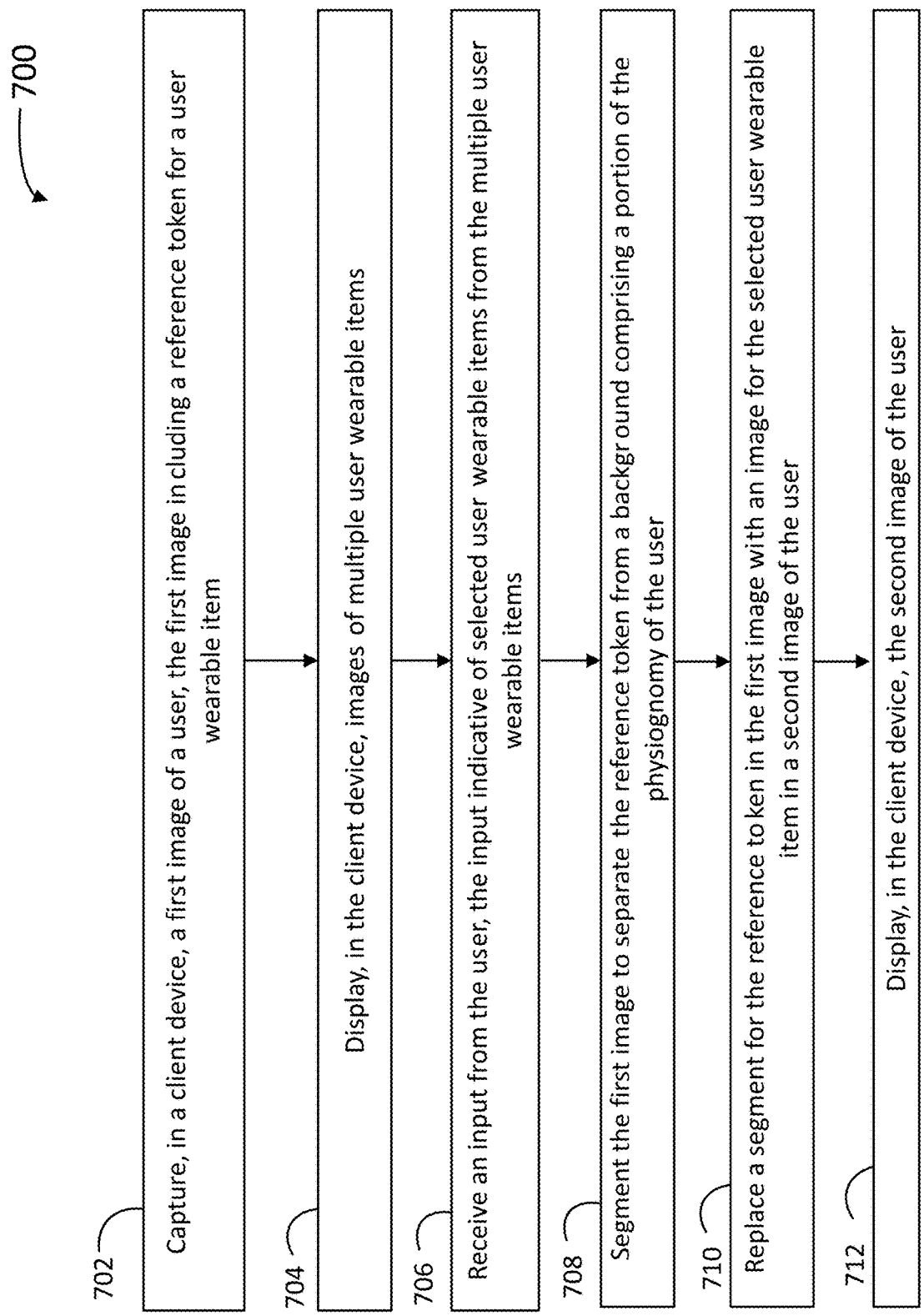
FIG. 7 is a flow chart illustrating steps in a method for providing an augmented reality try-on interface in a client device to a user, according to some embodiments.

FIG. 7 is a flow chart illustrating steps in a method 700 for providing an augmented reality try-on interface in a client device to a user, according to some embodiments. In some embodiments, at least one or more of the steps in method 700 may be performed by one or more devices such as a client device or a server in an architecture as disclosed herein (e.g., client devices 110, servers 130, and architecture 100). Accordingly, in some embodiments, at least one or more of the steps in method 700 may be performed by an application hosted by the server and running in the client device, wherein the client device and the server communicate with each other via communications modules, through a network (e.g., application 222, communications modules 218, and network 150). Moreover, the application may include commands stored in a first memory circuit, the server may host the application via a virtual embedding engine including instructions stored in a second memory circuit, and the client device and server may store data in, and retrieve data from, a reference frame database (e.g., memory circuits 220, virtual embedding engine 242, and reference frame database 252). The instructions in the memory circuits may be executed by processor circuits to cause the client device and the server to perform at least partially one or more of the steps in method 700 (e.g., processor circuits 212). In some embodiments, the virtual embedding engine includes a segmentation tool and a geometric tool, as disclosed herein (e.g., segmentation tool 244 and geometric rendition tool 246). Methods consistent with the present disclosure may include at least one step from method 700, and one or more steps in method 700 performed in a different order, overlapping in time, simultaneously, quasi-simultaneously, or at least partially overlapping in time.

Step 702 includes capturing, in a client device, a first image of a user, the first image including a reference frame for a user-wearable item. In some embodiments, the user-wearable items may include a pair of spectacles, a piece of clothing (e.g., a hat), jewelry, makeup, and the like.

Step 704 includes displaying, in the client device, images of multiple user-wearable items for the user.

Step 706 includes receiving an input from the user, the input indicative of a selected user-wearable item from the user-wearable items on display.

Step 708 includes segmenting the first image to separate the reference token from a background comprising a portion of a physiognomy of the user. For example, in some embodiments the portion of the physiognomy of the user may include a face of the user, a head of the user, an arm, a leg, a wrist, a hand, a finger, and the like. In some embodiments, step 708 includes identifying reference token pixels in the first image, segmenting the reference token pixels, and replacing the color of the reference token pixels with a background color or with the color of the selected user-wearable item, depending on their location.

Step 710 includes replacing a segment of the reference token in the first image with an image of the selected user-wearable item in a second image of the user. In some embodiments, step 710 includes replacing reference token pixels with virtual object pixels, wherein the virtual token pixels are selected from a reference frame database and modified with respect to orientation and position by the geometric rendition tool. In some embodiments, step 710 includes determining an orientation and a position of reference token with a geometric rendition tool and an internal model. In some embodiments, step 710 includes forming an internal model of the reference token and simulating multiple positions and orientations of the reference token. In some embodiments, step 710 includes selecting one or more positions and orientations that best match (or better match within a threshold) to a mask provided by the segmentation tool in step 708. In some embodiments, once the position and orientation of the reference token is determined, step 710 includes positioning and orienting an image of the selected user-wearable item (e.g., virtual object) to match the reference token. In some embodiments, step 710 further comprises replacing the pixels in the pixel mask with the corresponding pixels from the selected user-wearable item.

Step 712 includes displaying, in the client device, the second image of the user.

Figure 8:
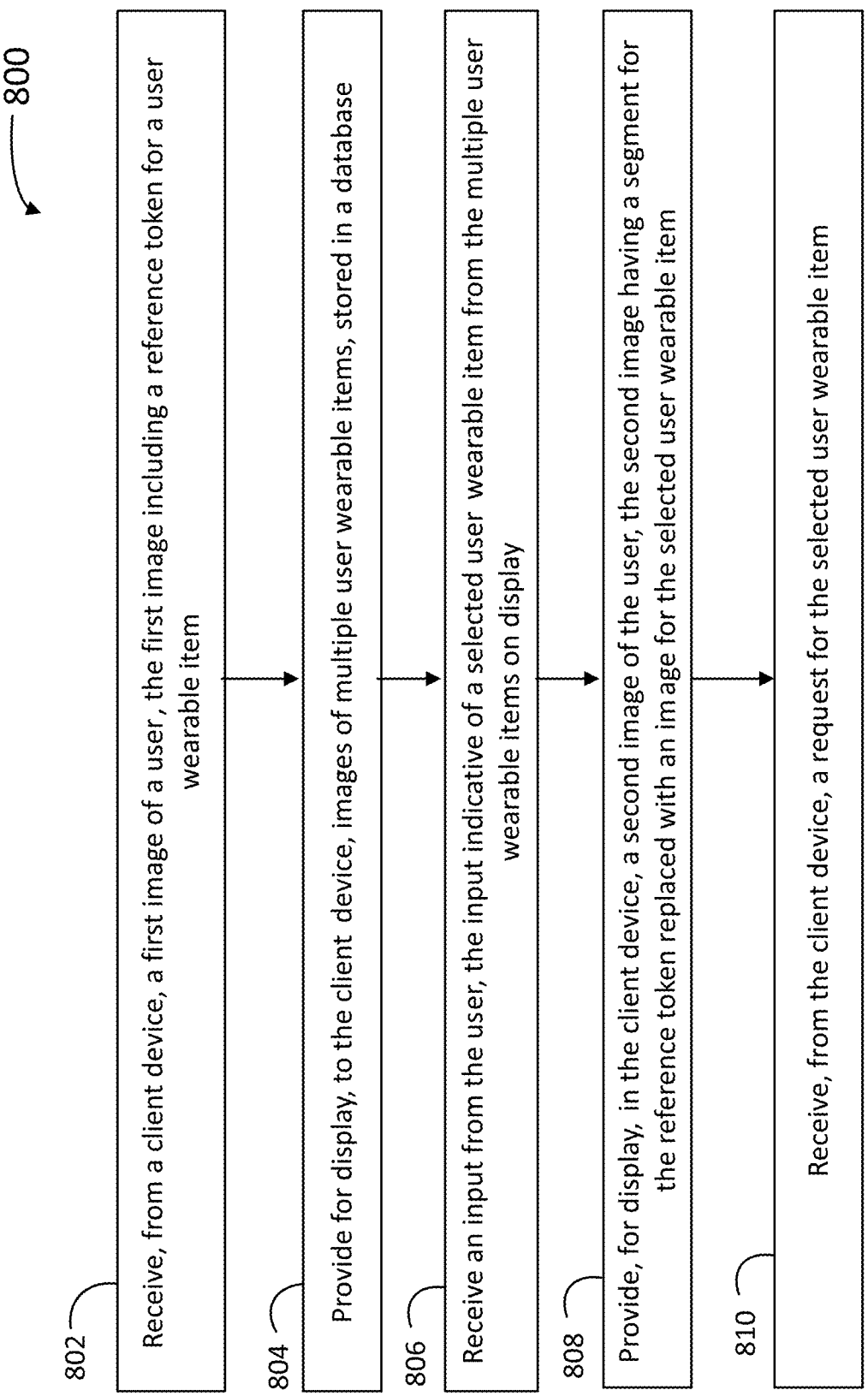
FIG. 8 is a flow chart illustrating steps in a method for hosting an augmented reality try-on interface from a server, according to some embodiments.

FIG. 8 is a flow chart illustrating steps in a method 800 for hosting an augmented reality try-on interface from a server, according to some embodiments. In some embodiments, at least one or more of the steps in method 800 may be performed by one or more devices such as a client device or a server in an architecture as disclosed herein (e.g., client devices 110, servers 130, and architecture 100). Accordingly, in some embodiments, at least one or more of the steps in method 800 may be performed by an application hosted by the server and running in the client device, wherein the client device and the server communicate with each other via communications modules, through a network (e.g., application 222, communications modules 218, and network 150). Moreover, the application may include commands stored in a first memory circuit, the server may host the application via a virtual embedding engine including instructions stored in a second memory circuit, and the client device and server may store data in, and retrieve data from, a reference frame database (e.g., memory circuits 220, virtual embedding engine 242, and reference frame database 252). The instructions in the memory circuits may be executed by processor circuits to cause the client device and the server to perform at least partially one or more of the steps in method 800 (e.g., processor circuits 212). In some embodiments, the virtual embedding engine includes a segmentation tool and a geometric tool, as disclosed herein (e.g., segmentation tool 244 and geometric rendition tool 246). Methods consistent with the present disclosure may include at least one step from method 800, and one or more steps in method 800 performed in a different order, overlapping in time, simultaneously, quasi-simultaneously, or at least partially overlapping in time.

Step 802 includes receiving, from a client device, a first image of a user, the first image including a reference token for a user-wearable item. In some embodiments, the user-wearable items may include a pair of spectacles, a piece of clothing (e.g., a hat), jewelry, makeup, and the like.

Step 804 includes providing for display, to the client device, images of multiple user-wearable items for the user stored in a database.

Step 806 includes receiving an input from the user, the input indicative of a selected user-wearable item from the pairs of spectacles on display.

Step 808 includes providing for display, in the client device, a second image of the user, the second image having a segment of the reference token replaced with an image of the selected user-wearable item. In some embodiments, step 808 further includes selecting a pixel in the first image based on an estimated position and orientation of a head of the user provided by a geometric rendition engine to identify the segment for the reference token. In some embodiments, step 808 further includes selecting multiple pixels from the first image and forming a mask to identify the segment of the reference token. In some embodiments, step 808 further includes determining an orientation and a position of the reference frame with a geometric rendition tool, and replacing the segment of the reference token in the first image with an image of a selected user-wearable item based on the orientation and the position of the reference token. In some embodiments, step 808 further includes positioning and orienting an image of the selected user-wearable item to match the reference token and to replace a segment of the reference token in the first image. In some embodiments, the reference token for a user-wearable item is a known object that fits on a portion of a physiognomy of the user. Accordingly, step 808 may include obtaining a model of a head of the user based on a two-dimensional projection of the known object in the first image, and superimposing a three dimensional model of the selected user-wearable item on the model of the head of the user.

Step 810 includes receiving, from the client device, a request for the selected user-wearable item.

Hardware Overview

Figure 9:
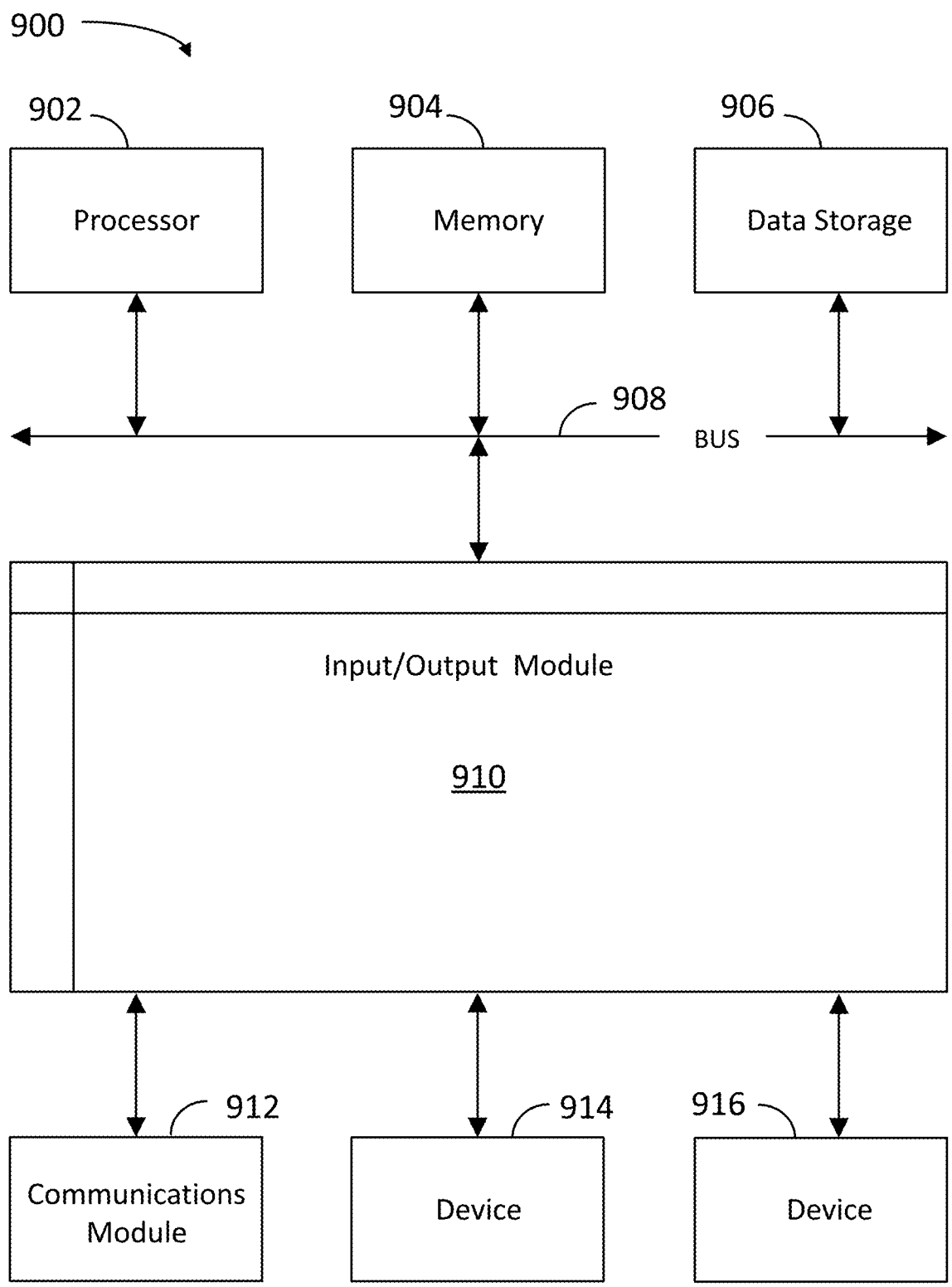
FIG. 9 is a block diagram illustrating an example computer system with which the architecture of FIG. 1 can be implemented, according to certain aspects of the disclosure.

FIG. 9 is a block diagram illustrating an exemplary computer system 900 with which the user device 110, and servers 130, of FIG. 1 can be implemented. In certain aspects, the computer system 900 may be implemented using hardware or a combination of software and hardware, either in a dedicated server, or integrated into another entity, or distributed across multiple entities.

Computer system 900 includes a bus 908 or other communication mechanism for communicating information, and a processor circuit 902 coupled with bus 908 for processing information. By way of example, the computer system 900 may be implemented with one or more processor circuits 902. Processor circuit 902 may be a general-purpose microprocessor circuit, a microcontroller, a Digital Signal Processor circuit (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor circuit firmware, a protocol stack, a database management system, an operating system, or a combination of one or more of them stored in an included memory circuit, such as a Random Access Memory circuit (RAM), a flash memory circuit, a Read-Only Memory circuit (ROM), a Programmable Read-Only Memory circuit (PROM), an Erasable PROM (EPROM), registers, a hard disk, a removable disk, a CD-ROM, a DVD, or any other suitable storage device, coupled to bus 908 for storing information and instructions to be executed by processor circuit 902. The processor circuit 902 and the memory circuit 904 can be supplemented by, or incorporated in, special purpose logic circuitry.

The instructions may be stored in the memory circuit 904 and implemented in one or more computer program products, i.e., one or more modules of computer program instructions encoded on a computer-readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory circuit 904 may also be used for storing temporary variable or other intermediate information during execution of instructions to be executed by processor circuit 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processor circuits executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 and/or an output device 916. Exemplary input devices 914 include a keyboard and a pointing device (e.g., a mouse or a trackball), by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as an LCD (liquid crystal display) or light-emitting diode (LED) display, for displaying information to the user.

According to one aspect of the present disclosure, user device 110 and servers 130 can be implemented using a computer system 900 in response to processor circuit 902 executing one or more sequences of one or more instructions contained in memory circuit 904. Such instructions may be read into memory circuit 904 from another machine-readable medium, such as data storage device 906. Execution of the sequences of instructions contained in main memory circuit 904 causes processor circuit 902 to perform the process steps described herein. One or more processor circuits in a multi-processing arrangement may also be employed to execute the sequences of instructions contained in memory circuit 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component (e.g., as a data server), or that includes a middleware component (e.g., an application server), or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication (e.g., a communication network). The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor circuit 902 for execution. Such a medium may take many forms, including, but not limited to, non-volatile media, volatile media, and transmission media. Non-volatile media include, for example, optical or magnetic disks, such as data storage device 906. Volatile media include dynamic memory circuit, such as memory circuit 904. Transmission media include coaxial cables, copper wire, and fiber optics, including the wires that comprise bus 908. Common forms of machine-readable media include, for example, a floppy disk, a flexible disk, a hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory circuit chip or cartridge, or any other medium from which a computer can read. The machine-readable storage medium can be a machine-readable storage device, a machine-readable storage substrate, a memory circuit device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   capturing, by a client device, a first image of a user, the first image including a reference token for a user-wearable item, the reference token being worn by the first user in the first image and having a known three-dimensional model;
   automatically generating, by the client device, a three-dimensional model of a face of the user from the first image of the user, the three-dimensional model of the face of the user including dimensions based on the known three-dimensional model of the reference token;
   displaying, by the client device, images of multiple user-wearable items for the user;
   receiving an input from the user, the input indicative of a selected user-wearable item from the user-wearable items on display, the selected user-wearable item having an associated three-dimensional model;
   segmenting, by the client device, the first image to separate the reference token from a background comprising a portion of a physiognomy of the user;
   replacing, by the client device, a segment for the reference token in the first image with an image for the selected user-wearable item in a second image of the user based on the three-dimensional model of the face of the user and the three-dimensional model of the selected user-wearable item; and
   displaying, by the client device, the second image of the user.

2. The computer-implemented method of claim 1, wherein the first image of the user and the second image of the user include a time sequence of user movements, the method further comprising displaying a video of the time sequence of user movements.

3. The computer-implemented method of claim 1, wherein the portion of the physiognomy of the user is a face of the user, and segmenting the first image comprises determining a size of the face of the user based on the known dimension of the reference token.

4. The computer-implemented method of claim 1, wherein segmenting the first image to separate the reference token from a background comprises determining at least one pixel in the first image that belongs to the reference token.

5. The computer-implemented method of claim 1, wherein segmenting the first image to separate the reference token comprises selecting a pixel in the first image based on a reference token color.

6. The computer-implemented method of claim 1, wherein the user-wearable item is a pair of spectacles and replacing a segment of the reference token comprises replacing a lens type in the pair of spectacles.

7. The computer-implemented method of claim 1, wherein the reference token for the user-wearable item comprises a portion of the user-wearable item indicative of a scale in a geometric feature of the first image, further comprising determining a size and a relative position of multiple anatomic features of the portion of the physiognomy of the user.

8. The computer-implemented method of claim 1, wherein capturing the first image of the user comprises requesting the user for a new image capture when the first image has an error.

9. The computer-implemented method of claim 1, further comprising requesting from the user, an identification code associated with the reference token.

10. The computer-implemented method of claim 1, further comprising receiving, from the user, a request for the selected user-wearable item.

11. A system, comprising:
    a memory circuit storing instructions; and
    a processor circuit configured to execute the instructions to cause the system to:
    capture, in a client device, a first image of a user, the first image including a reference token for a user-wearable item, the reference token being worn by the first user in the first image and has a known three-dimensional model including a known dimension;
    automatically generate, by the client device, a three-dimensional model of a face of the user from the first image, the three-dimensional model of the face of the user including dimensions based on the known three-dimensional model of the reference token;
    display, by the client device, images of multiple user-wearable items for the user;
    receive an input from the user, the input indicative of a selected user-wearable item from the user-wearable items on display, the selected user-wearable item having an associated three-dimensional model;
    segment, by the client device, the first image to separate the reference token from a background comprising a portion of a physiognomy of the user;
    replace, by the client device, a segment for the reference token in the first image with an image for the selected user-wearable item in a second image of the user based on the three-dimensional model of the face of the user and the three-dimensional model of the selected user-wearable item; and display, by the client device, the second image of the user.

12. The system of claim 11, wherein the first image of the user and the second image of the user include a time sequence of user movements, and the processor circuit further executes instructions to display a video of the time sequence of user movements.

13. The system of claim 11, wherein to segment the first image to separate the reference token from a background the processor circuit executes instructions to determine at least one pixel in the first image that belongs to the reference token.

14. A method, comprising:
generating, by a client device, a three-dimensional model of a face of the user from a first image of a user that includes a reference token having a known three-dimensional model being worn by the user, the three-dimensional model of the face of the user including dimensions based on the known three-dimensional model of the reference token;

displaying, by the client device, at least one image of at least one user-wearable item, the at least one user-wearable item having an associated three-dimensional model;

receiving an input from the user, the input indicative of a selected user-wearable item from at least one image of at least one user-wearable item;

segmenting, by the client device, the first image to separate the reference token from a background comprising a portion of a physiognomy of the user;

replacing, by the client device, a segment for the reference token in the first image with an image for the selected user-wearable item in a second image of the user based on the three-dimensional model of the face of the user and the three-dimensional model of the selected user-wearable item; and displaying, by the client device, the second image of the user.

15. The method of claim 14, wherein the portion of the physiognomy of the user is a face of the user, and segmenting the first image comprises determining a size of the face of the user based on the known dimension of the reference token.

16. The method of claim 14, wherein segmenting the first image to separate the reference token from a background comprises determining at least one pixel in the first image that belongs to the reference token.

17. The method of claim 14, wherein segmenting the first image to separate the reference token comprises selecting a pixel in the first image based on a reference token color.

18. The method of claim 14, wherein the reference token for the user-wearable item comprises a portion of the user-wearable item indicative of a scale in a geometric feature of the first image, further comprising determining a size and a relative position of multiple anatomic features of the portion of the physiognomy of the user.

19. The method of claim 14, further comprising capturing, by the user device, the first image of the user using a camera associated with the user device.

20. The method of claim 14, further comprising requesting from the user, an identification code associated with the reference token.

* * * * *